Feb. 21, 1933.  M. TURNQUIST  1,898,511
HINGE DEVICE
Filed March 24, 1930
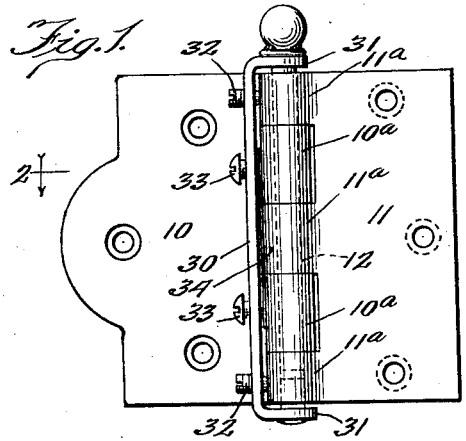
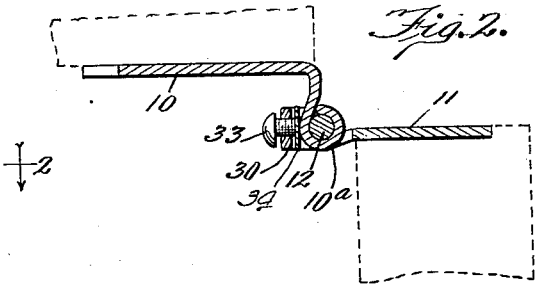
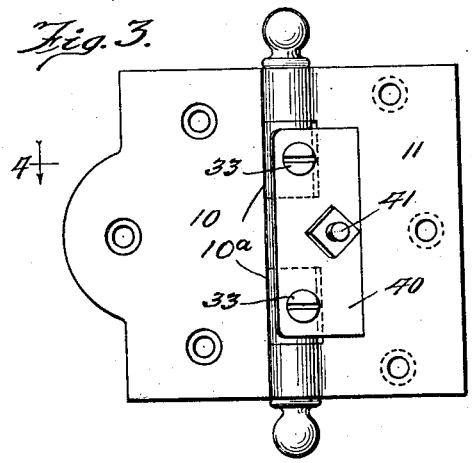
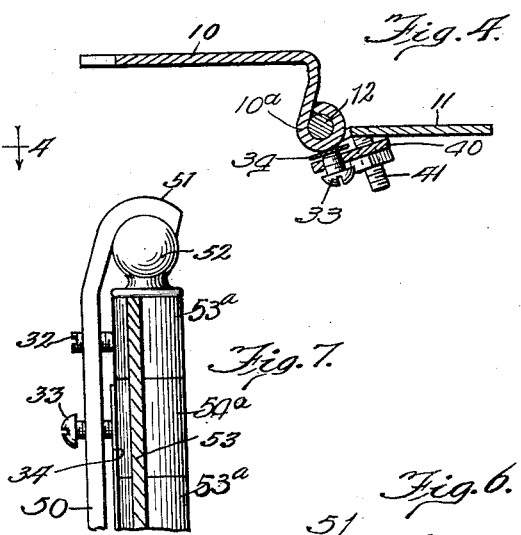
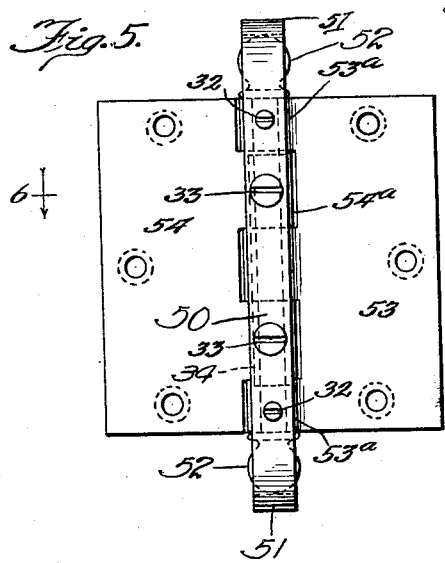
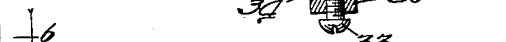
Inventor:
Magnus Turnquist,
By A. Miller Belfield
Atty.

Patented Feb. 21, 1933

1,898,511

UNITED STATES PATENT OFFICE

MAGNUS TURNQUIST, OF CHICAGO, ILLINOIS

HINGE DEVICE

Application filed March 24, 1930. Serial No. 438,355.

My invention relates to hinge devices which are capable of use in various places, as, for example, in hinges where friction may be employed to retard or stop the swinging action of the hinge.

One of the objects of the invention is to provide a simple, practical and advantageous construction of friction hinge.

Another object of the invention is to arrange for the ready adjustment of the friction element so that it may be caused to exert more or less friction, as desired.

In the drawing:

Fig. 1 is an elevation of a hinge showing one embodiment of the invention;

Fig. 2 is a section at the line 2—2 on Fig. 1;

Fig. 3 is a view of a modification of the invention;

Fig. 4 is a section at the line 4—4 on Fig. 3;

Fig. 5 is a view in elevation of a further modification of the invention;

Fig. 6 is a section at the line 6—6 of Fig. 5; and

Fig. 7 is a side view of the device disclosed in Fig. 5 showing the leaf in section.

In Figs. 1, 2, 3 and 4 is shown what may be understood to be a cabinet hinge having the two leaves 10 and 11 and the pintle 12 occupying the bore of the matched cylindrical portions $10^a$ and $11^a$. The cylindrical portions $10^a$—$10^a$ are integral with the leaf 10 and the portions $11^a$—$11^a$ are integral with the leaf 11.

In the arrangement shown in Figs. 1 and 2, a yoke 30 is mounted adjacent the cylindrical portions of the hinge and held in position by the pintle 12 passing through holes in the bent ends 31—31 of the member 30. This member is held rigidly with respect to one leaf, 11 in this instance, by virtue of the set screws 32—32 which have screw-threaded engagement with the member 30 and arranged to impinge against the cylindrical parts $11^a$—$11^a$ of the leaf. In the yoke 30 are friction devices 33—33 in the form of screws mounted in the yoke 30 in a position opposite the cylindrical portions $10^a$—$10^a$ of the leaf 10. These screws 33—33 adjustably hold a friction strip 34 against the cylindrical portion $10^a$—$10^a$ and in frictional contact of varying degree.

In the form shown in Figs. 3 and 4 the friction producing means comprises a plate 40 mounted on the leaf 11 by a bolt 41. The plate 40 supports adjusting screws 33—33 for cooperating with a friction strip 34 and operates in every respect in the same way and with the same results as the devices in the form first described.

In Figs. 5, 6 and 7 is shown a form very similar to that shown in Fig. 1 except that the yoke 50 (see Fig. 7) is shown as applied to a square butt hinge and in such way that the entire assembly may be applied to any hinge of that general type and size, even after the hinge is in position, without the necessity of performing any machine work or operations on the hinge itself.

This yoke 50 has its bent ends 51 arranged to engage the pintle 52 at the extreme ends thereof, instead of passing the pintle through holes in the bent portion 31, as in the previous case. The remainder of the attachment, beyond the yoke 50 is exactly the same as in the previous instance, including the set screws 32—32 and the friction strip 34, which engages the cylindrical hinge members $53^a$ and $54^a$ of the leaves 53 and 54, respectively.

It will be seen that by this arrangement a friction device for hinges may be applied entirely extraneous to the hinge, that is, without any specially designed pintle and that the device may even be applied to hinges after they have been installed in position.

It will be understood that changes and modifications may be made without departing from the spirit of the invention.

I claim:

In a device of the character described including two hinge leaves and matched cylindrical portions, a pintle for operatively connecting the parts, and means for mounting a friction strip rigidly with respect to one leaf and arranged to adjustably oppose the swinging movement of the other leaf by being held against the exterior surface thereof.

In witness whereof, I hereunto subscribe my name this 22nd day of March, A. D., 1930.

MAGNUS TURNQUIST.